(12) United States Patent
Ben-Simhon et al.

(10) Patent No.: US 11,436,688 B2
(45) Date of Patent: Sep. 6, 2022

(54) USING A MULTI-ARMED BANDIT APPROACH FOR BOOSTING CATEGORIZATION PERFORMANCE

(71) Applicant: Intuit Inc., Mountain View, CA (US)

(72) Inventors: Yonatan Ben-Simhon, Tel Aviv (IL); Liron Hayman, Tel Aviv (IL); Yair Horesh, Tel Aviv (IL); Yehezkel Shraga Resheff, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 428 days.

(21) Appl. No.: 16/587,721

(22) Filed: Sep. 30, 2019

(65) Prior Publication Data

US 2021/0097626 A1 Apr. 1, 2021

(51) Int. Cl.
| | |
|---|---|
| *G06Q 40/00* | (2012.01) |
| *G06N 20/00* | (2019.01) |
| *G06F 16/21* | (2019.01) |
| *G06F 16/28* | (2019.01) |
| *G06F 9/46* | (2006.01) |
| *G06F 16/23* | (2019.01) |
| G06F 3/0482 | (2013.01) |

(52) U.S. Cl.
CPC ............ *G06Q 40/12* (2013.12); *G06F 9/466* (2013.01); *G06F 16/219* (2019.01); *G06F 16/23* (2019.01); *G06F 16/285* (2019.01); *G06N 20/00* (2019.01); *G06F 3/0482* (2013.01)

(58) Field of Classification Search
CPC ...... G06N 5/003; G06N 20/00; G06F 16/285; G06F 3/0482; G06F 9/466; G06F 16/23; G06F 16/219; G06F 16/21; G06F 16/28; G06F 9/46; G06Q 40/12; G06Q 40/00
USPC .......................................................... 705/30
See application file for complete search history.

(56) References Cited

U.S. PATENT DOCUMENTS

| | | | | |
|---|---|---|---|---|
| 7,966,334 B1 * | 6/2011 | Bezos | ..................... | G06Q 30/06 707/748 |
| 8,095,436 B1 * | 1/2012 | Shah | ...................... | G06Q 40/02 705/30 |

(Continued)

FOREIGN PATENT DOCUMENTS

| | | | |
|---|---|---|---|
| CN | 109829721 A | * | 5/2019 |
| KR | 20090120232 A | * | 11/2009 |

*Primary Examiner* — Andrew Joseph Rudy
(74) *Attorney, Agent, or Firm* — DLA Piper LLP (US)

(57) ABSTRACT

A computer-implemented method is provided to preforming re-categorization of financial transactions. The re-categorization is implemented by a server computing device which receives the financial transactions associated with a merchant and a first category. The server computing device receives user inputs that are each associated with re-categorizing a financial transaction from the first category to one or more other categories. Based at least in part on a count of the first category and counts of the one or more other categories, the server computing device determines a set of normalized ratios for the first category and the one or more other categories with respect to a total number of respective financial transactions received. The server computing device determines a second category corresponding to a minimum value in the set of the normalized ratios for each financial transaction associated with the merchant.

20 Claims, 6 Drawing Sheets

(56) References Cited

U.S. PATENT DOCUMENTS

| | | | | |
|---|---|---|---|---|
| 8,447,666 | B1* | 5/2013 | Keld | G06Q 20/00 |
| | | | | 705/16 |
| 10,521,856 | B1* | 12/2019 | Joseph | G06Q 40/00 |
| 10,740,826 | B2* | 8/2020 | Carr | G06Q 30/0633 |
| 10,891,690 | B1* | 1/2021 | Haffey | G06F 3/017 |
| 10,936,679 | B1* | 3/2021 | Krakowiecki | G06F 16/244 |
| 11,004,006 | B2* | 5/2021 | Bandyopadhyay | G06N 20/00 |
| 11,222,353 | B1* | 1/2022 | Chang | G06Q 30/0233 |
| 2007/0276751 | A1* | 11/2007 | Lawrence | G06Q 40/025 |
| | | | | 705/38 |
| 2013/0282533 | A1* | 10/2013 | Foran-Owens | G06Q 30/0641 |
| | | | | 705/27.1 |
| 2014/0188678 | A1* | 7/2014 | Keld | G06Q 40/10 |
| | | | | 705/35 |
| 2015/0317747 | A1* | 11/2015 | Ghosh | G06Q 40/12 |
| | | | | 705/30 |
| 2017/0046732 | A1* | 2/2017 | Elmachtoub | G06Q 30/0256 |
| 2019/0295100 | A1* | 9/2019 | Wilkinson | G06Q 30/016 |
| 2020/0342500 | A1* | 10/2020 | Kulkarni | G06Q 30/0277 |

* cited by examiner

USING A MULTI-ARMED BANDIT APPROACH FOR BOOSTING CATEGORIZATION PERFORMANCE

The present disclosure relates to boosting transaction categorization using a multi-armed bandit approach.

BRIEF DESCRIPTION OF THE FIGURES

The foregoing and other aspects of embodiments are described in further detail with reference to the accompanying drawings, in which the same elements in different figures are referred to by common reference numerals. The embodiments are illustrated by way of example and should not be construed to limit the present disclosure.

FIG. 4A is an example screenshot of a user financial transaction displayed on a user interface in accordance with some embodiments of the present disclosure.

FIG. 4B is an example screenshot of a list of a plurality of related categories associated with the displayed transaction in accordance with some embodiments of the present disclosure.

FIG. 4C is a screenshot of a user selection of a category for the respective transaction in accordance with some embodiments of the present disclosure.

FIG. 4D is a screenshot illustrating a transaction with a reassigned category in accordance with some embodiments of the present disclosure.

DETAILED DESCRIPTION

Figure 1:
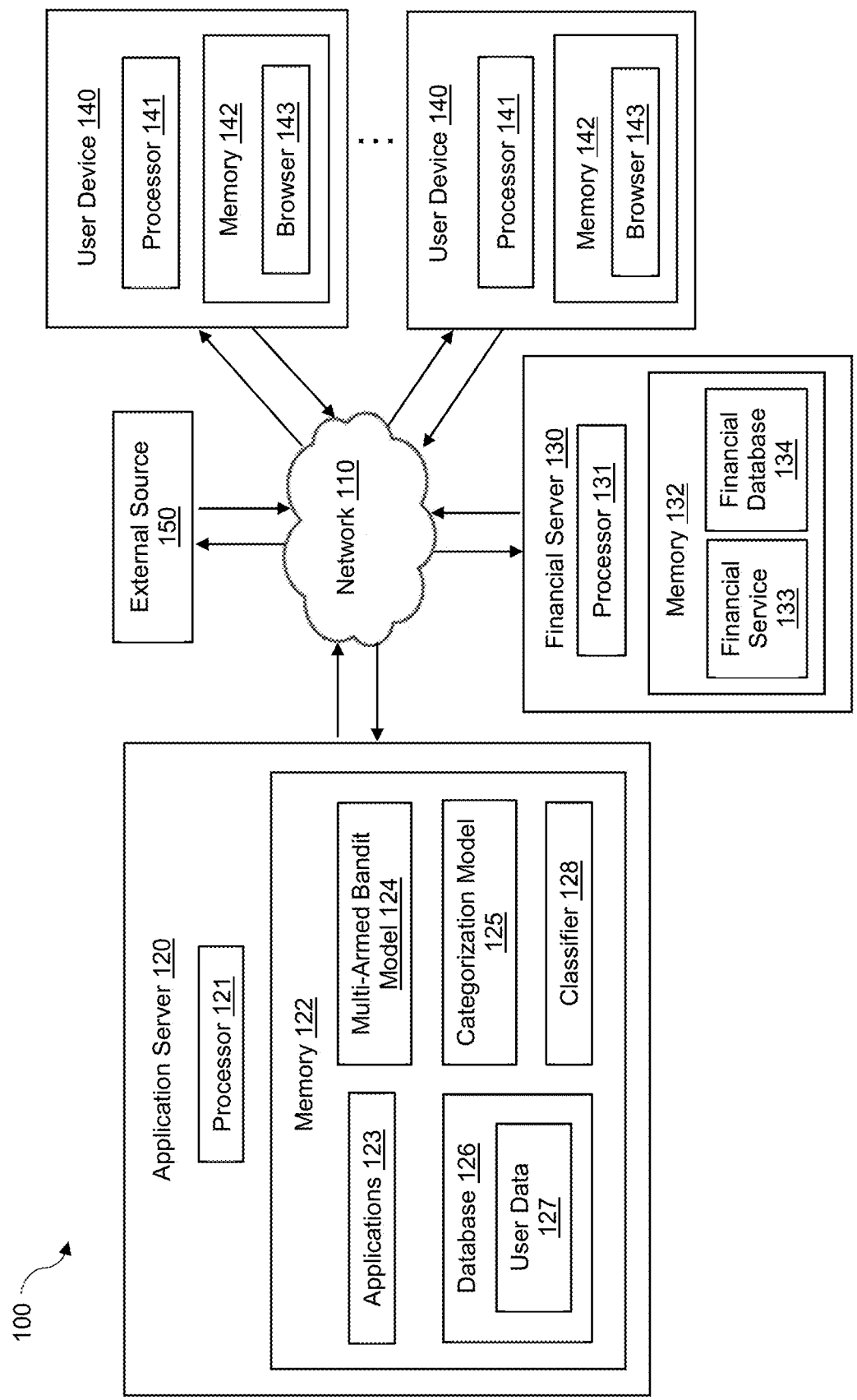
FIG. 1 is an example computing environment according to some embodiments of the present disclosure.

Embodiments of the present disclosure may be configured to automatically re-categorize electronic financial transactions and optimize associated categories based on user inputs of changes to categories of the electronic financial transactions.

Electronic transactions obtained from financial institutions constitute an enormous amount of data held by merchants for their customers. For example, standalone or online financial management products or services such as Intuit Mint® may provide electronic transaction management for a great number of users. Intuit Mint® users may make billions of transactions every year. Each transaction may include an amount paid by the user, a merchant name and/or a category of goods and/or services provided by the merchant, etc. Transaction categories are used to classify the products and services that merchants sell or provide to customers. The categories may be represented by words or phrases. Some examples of categories include "restaurants", "transportations", "grocery stores", "gas", "travel-related expenses", "hotels", "events".

Understanding the nature of transactions and specifically optimizing the respective transaction categories may help with managing the products and features to improve user satisfaction by tailoring categories to suit individual users' needs. Existing methods of automated category assignments to the transactions may not quickly respond to market trends or changes. A category received or assigned by existing automated category assignment systems for transactions associated with a merchant may not correctly reflect a category that a majority of users usually prefer. Additionally, transactions from new merchants with few recorded transactions may not be categorized correctly by existing systems. For example, an automatic category assignment of "Gas & Fuel" may be generated by the existing system for transactions associated with a merchant which provides home goods to users. There is a need to consider these situations and provide an accurate and optimized categorization process to adapt to diverse choices and needs of a large amount of customers.

The technical strategy of re-categorization may be implemented in a computing system including a financial management application and browser applications in a server-client computing environment. Users may interact with an application server hosting a commercial website via browser applications executed on the user computing devices. Users may reassign categories associated with respective transactions via user interfaces of user computing devices.

When users utilize a financial management service (e.g., software product) implemented in a computing system to modify their own lists of possible categorizations for financial transactions associated with a plurality of merchants, data indicating the user modifications of their own lists of possible categorizations for the respective financial transactions may be obtained by the corresponding financial management service. In one embodiment, the obtained data indicating the user's modification of possible categorizations for the respective financial transactions may be processed and analyzed by the financial management service to preform re-categorization for the financial transactions associated with a plurality of merchants. The reassigned category for the financial transactions may be made available to, and/or used by, a community of users of the financial management service.

The present disclosure may utilize a method with multi-armed bandit (MAB) technology in the computer-implemented financial management system to constantly explore the correct categorization for both known and new types of financial transactions from financial institutions. A MAB framework may quickly identify a category that is most favored by the users based on the minimum of re-categorization normalized ratios of a set of categories of transactions associated with a merchant.

This approach may boost the ability of existing or future categorization or re-categorization systems and methods to be able to optimize and update transaction categories in real time in response to constantly changing scenarios in the financial environment and further improve user satisfaction by tailoring categories to suit users' needs.

As used in this application, the "financial management service" and/or "financial service" include, but are not limited to, one or more separate and independent software and/or hardware components of a computer that may be added to and/or executed on a general purpose computer before the computer can receive user inputs from other computers and software to perform re-categorization operations.

As used in this application, the "user actions" include, but are not limited to, user inputs and/or selections of text expressions of one or more categories associated with electronic financial transactions of one or more merchants. The user inputs may be performed by users by selecting user interface objects displayed on user interfaces of user devices through browser applications over a network.

FIG. 1 illustrates an example computing environment 100 that may be used for re-categorizing user financial transactions to generate target categories for different sets of financial transactions associated with respective merchants, in which users may modify a plurality lists of the categories of the user financial transactions. As shown in FIG. 1, the computing environment 100 may include application server 120, financial server 130, one or more user devices 140, and one or more external resources 150. Application server 120, financial server 130, and/or user devices 140 may be configured to communicate with one another through network 110. For example, communications between various network and computing devices may be facilitated by one or more application programming interfaces (APIs). APIs of the computing environment 100 may be proprietary and/or may be examples available to those of ordinary skill in the art such as Amazon® Web Services (AWS) APIs or the like.

Application server 120 may be configured to gather transaction data associated with a plurality of purchases or other financial activities associated with respective merchants and the users. The transaction data may be acquired from financial server 130, user devices 140, and/or one or more external resources 150 which may be available through network 110. A plurality of data transactions may be acquired and accumulated by financial server 130 and stored in a financial database 134 of the computing environment 100. Financial database 134 may store financial transactions, financial account settings and modifications thereto and/or may update financial data to be presented to the user in real time. The user transactions may be stored in a particular commercial management system. The user transactions may be stored in a cloud computing system proving an access permission according to inquiries of users. In some embodiments, the application server 120 may be coupled with the financial server 130 to implement the financial service and/or application 133 of financial institutions to directly retrieve and aggregate user transaction data from various user accounts and store user transactions in financial database 134. Application server 120 may be configured to analyze the user inputs that are each associated with re-categorizing a financial transaction from an initial category to one or more other categories.

Application server 120 may include one or more applications 123 stored in memory 122 and executed by processor 121 for providing one or more online services and providing a website with particular services for users to visit. Memory 122 may store applications 123 and other program modules which are implemented in the context of computer-executable instructions and executed by application server 120. In some embodiments, application server 123 may include a Multi-Armed Bandit (MAB) model 124, a categorization model 125, a database 126 storing user data 127, etc. The Multi-Armed Bandit (MAB) model 124 may be one of components of the applications 123. In some embodiments, application server 120 may include a classifier 128 which may be configured to classify the transactions based on different categories which may be provided to and utilized with the Multi-Armed Bandit (MAB) model 124.

In some embodiments, applications 123 may be configured to implement an existing financial management service which may include a financial transaction categorization capability operation to help users manage their finances by providing a centralized interface with banks, credit card companies, and other various financial institutions, for electronically identifying and categorizing user financial transactions.

The existing financial management service may be configured to identify a set of financial transactions associated with each merchant and initially generate a suggested category (e.g., an initial category or a first category) for the respective financial transactions. The existing financial management service may provide each user, via the user interface, with a set of transaction attributes, an initial category and a list of possible categories for each financial transaction. The user may choose to change the initial category to a preferred category for the displayed transaction via a user interface. Specific examples of financial management products or services include, but are not limited to Intuit Mint® and/or various other software systems known to those of skill in the art and/or as developed in the future.

Application server 120 may include and implement one or more models to identify user transactions associated with the plurality of users. In some embodiments, application server 120 may be configured to generate models using real-world user data and machine learning processing. Application server 120 may include and apply multi-armed bandit (MAB) model 124 which may be configured to identify a transaction category that is most favored by the users based on a minimum value of the normalized category ratio of the assigned and reassigned categories associated with the merchant. Application server 120 may include and implement one or more models to identify user transactions associated with the plurality of users and merchants. In some embodiments, application server 120 may be configured to generate models using real-world user data and machine learning processing. Application server 120 may include and apply a multi-armed bandit (MAB) model 124 to identify best favorable or preferred transaction category modifications that the users make through their user devices 140.

Applications 123 may include a web application to provide an online financial management service that may be accessed by the user device 140 via a browser 143 (e.g., browser application). In one embodiment, application server 120 may communicate with financial server 130 to effect changes in the users' financial transactions and/or account settings. Financial server 130 may include a financial service 133 (e.g., a financial application) stored in memory 132 and executed by processor 131 for gathering data about financial transactions made by users from financial service 133, external source 150, and/or user devices 150 through network 110. For example, data gathering may include interfacing with financial service 133 and/or external source 150 using one or more APIs.

Financial service 133 and/or applications of financial institutions may acquire transactions which comprise electronic transaction data and are generated when a user purchases an item from a merchant over an online website and/or at the merchant location. For example, financial service 133 may be a financial management service such as Intuit Mint®. These transactions may be recorded in their respective user accounts. The financial service 133 and/or applications of financial institutions may acquire the information from the user accounts, which may be on-line accounts that are also accessible by the users (e.g., account holders). The financial service and/or application 133 of financial institutions may be used to acquire electronic transaction data from various user accounts, e.g., accounts such as a savings account, a checking account, a money market account, and a credit card account, which may be debited using a debit card, credit card or check, for example.

User device 140 may include a processor 141, a memory 142, and a browser application 143. Browser application 143 may facilitate user interaction with application server 120 and may be configured to transmit information to and receive information from application server 120 via network 110. User device 140 may be any devices configured to present user interfaces and to receive inputs thereto. For example, user device 140 may be a smartphone, a personal computer, a tablet, a laptop computer, a personal digital assistant (PDA), or any computing system that may be equipped with browser 143, which may be used to provide a convenient interface to allow a user to interact with applications 123 running in application server 120 or financial service 133 running in financial server 130 over at least one network 110.

The database 126 may store user data 127 such as user profiles including a plurality of historical user features or attributes representing user actions (e.g., behaviors) while the users interact with application server 120 regarding various products or services through user devices 140. Each user may create or register a user account with user information for subscribing and accessing a particular product or service provided by the application server 110 via browser 143 through respective user device 140. Each user account with user information may be stored as each user profile including user name, user identifier (ID), user accounts associated with one or more subscribed products or services, email address, phone number, payment transaction accounts, and any other user information.

In one embodiment, user device 140 may be a mobile device which is installed with a mobile application to access a financial management service run on the application server 120 by registering a user account. User device 140 may be any device configured to present user interfaces, receive user inputs and allow a user to communicate with different elements of the computing environment 100 via network 110 thereto. User device 140 may access the present transactions or modify financial settings from services provided by applications 123. For example, financial settings may be related to modify and update categories of one or more transactions. Detailed examples of the data exchanged between user devices 140 and other elements in the computing environment 100 are provided below.

Application server 120, financial server 130, user devices 140, and external resource 150, are each depicted as a single device for ease of illustration, but those of ordinary skill in the art will appreciate that application server 120, financial server 130, user devices 140, and/or external resource 150, may be embodied in different forms for different implementations. For example, Application server 120, and/or financial server 130 may include a plurality of servers. Alternatively, the operations performed by application server 120 and/or financial server 130 may be performed on a single server. In another example, a plurality of user devices 140 may communicate with application server 120 and/or financial server 130. A single user may have multiple user devices 140, and/or there may be multiple users each having their own user device(s) 140. Any number and/or type of external resources 150 may be available through network 110 and, as described below, may include sources such as social media and/or location data providers. Transaction data may be continuously obtained from financial institutions or external resources and received by the application server 120.

Figure 2:
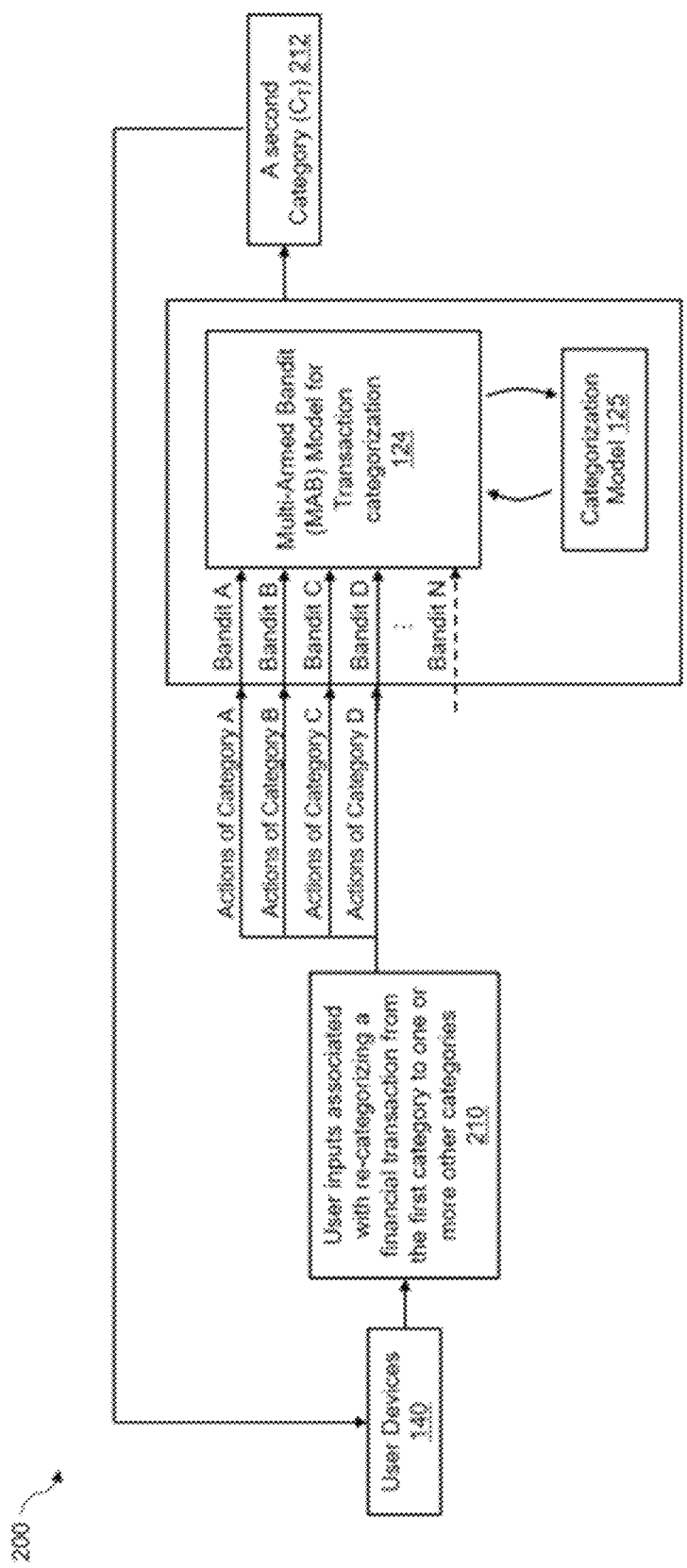
FIG. 2 is a conceptual diagram to illustrate a partial Multi-Armed Bandit (MAB) framework utilized in a process of boosting categorization performance according to some embodiments of the present disclosure.

FIG. 2 is a conceptual diagram of a partial Multi-Armed Bandit (MAB) framework used in an iterative process for boosting categorization performance according to some embodiments of the present disclosure. The MAB framework may utilize a reinforcement learning strategy to automate a category optimization process by exemplifying the exploration-exploitation tradeoff to find a best favorable and optimal category for a set of user transactions associated with a merchant. In some embodiments, the MAB model 124 may include any combination of software and software components (e.g., data structures, algorithms, procedures, libraries, modules, interfaces, frameworks, applets, web applications, desktop applications, browsers, etc.). In some embodiments, the MAB model 124 may be configured with a categorization algorithm of a categorization model 125 to provide a solution to quickly and dynamically determine a transaction category that is most favored by the users in a real-world scenario. By referring to FIG. 1, application server 120 may retrieve and aggregate transaction records during a period of time from a financial database 134 storing user transactions over the network 110. Each data transaction may include a plurality of attributes, such as a merchant name, a user identifier (ID), a short textual description, a date and an amount associated with the data transaction. Application server 120 may include a financial management service configured to receive and process a plurality of financial transactions to identify and suggest an initial category for each data transaction from a list of known categories by querying for an attribute (e.g., transaction description) of the data transactions. Each transaction for a given merchant may be classified and categorized as belonging to an initial category (e.g., a first category) automatically. For example, as shown in FIG. 2, users may keep an initial category D unchanged. If users perceive the transaction categories to be incorrect or inappropriate, the users may reassign the initial category D into a category for respective transactions, such as category A, category B, or category C, etc.

The MAB model 124 may be configured to identify user inputs 210 and/or actions associated to transaction categories and count the category changes in real time for a plurality of time periods, such as a number of days (e.g., a week or 30 days). The MAB model 124 may be configured to calculate a re-categorization ratio distribution and re-categorization normalized ratio for each category, and determine a target category $C_T$ which is most likely to be correct according to the algorithmic approach described below. The MAB model 124 may be configured to determine the target category $C_T$ (e.g., a second category) associated with a minimum value of the normalized category ratio of all observed transaction categories of the merchant, as described in processes 300 and 500 below.

The conceptual diagram illustrated in FIG. 2 may be utilized to provide a MAB framework for continuously exploring and exploiting transition categories based on user actions in an iterative process so as to find best and correct categories for associated transactions while minimizing or avoiding user actions to change transaction categories according to the following algorithmic approach.

Figure 3:
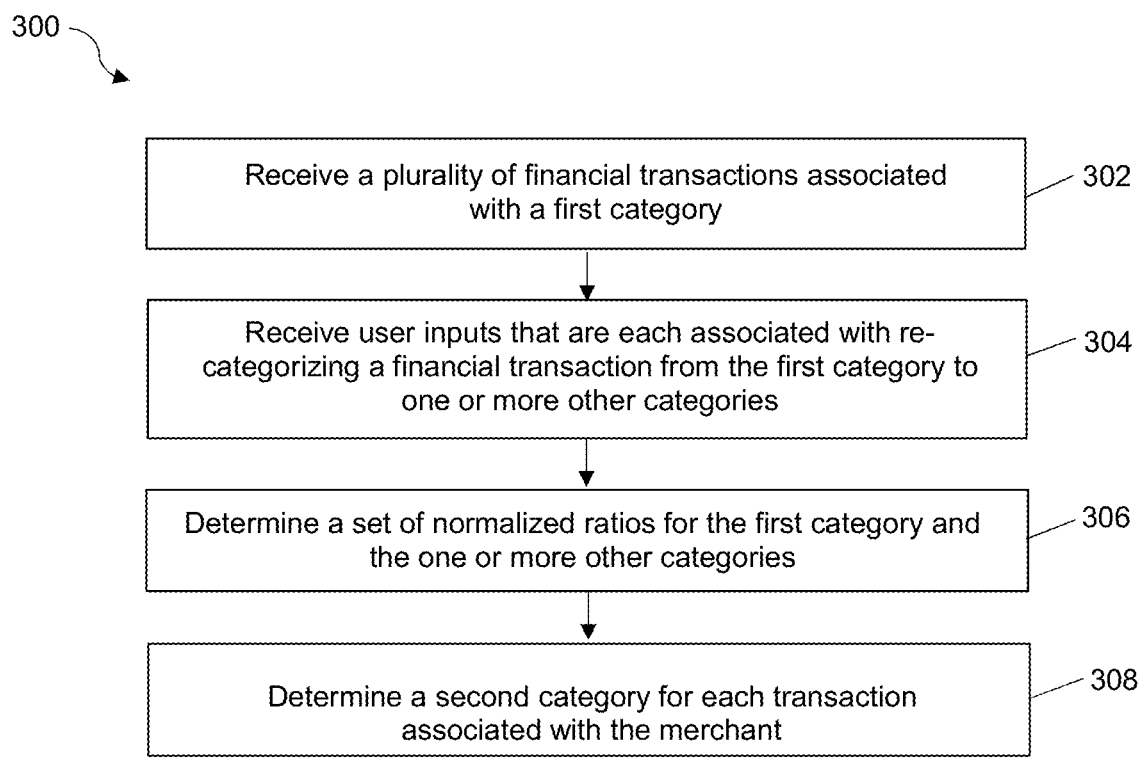
FIG. 3 is a flowchart illustrating an example process configured to preform automatic categorization in response to user inputs according to some embodiments of the present disclosure.

FIG. 3 is a flowchart diagram illustrating an example process 300 to preform categorization based on user inputs according to an embodiment of the present disclosure. The process 300 may be described to represent a sequence of operations that can be performed by one or more computers including hardware, software, or a combination in the above described systems. Thus, the described operations may be performed by executing a MAB model with computer-executable instructions under control of one or more processors. The order in which the operations are described is not intended to be construed as a limitation, and any number of the described operations can be combined in any order and/or in parallel to implement the process.

At 302, the application server 120 may receive transaction data associated with a set of financial transactions for a time period (e.g., a day, a week or a month). The set of the financial transactions may be associated with a plurality of users, a merchant and an initial category. The initial category may be assigned or suggested by an existing financial service or product 123 running on the application server 120. In an embodiment, the initial category may be assigned by an existing financial service or product 133 running on or an financial server 130 via at least one network 110.

The initial category and a set of transaction attributes along with each associated transaction may be presented on a user interface of a user computing device 140 via a web application for each time period over at least one network. The web application may provide an online financial management service and the user may access the online financial management service with the registered user account through the browser application 143 by the user device 140 over a network. For example, each financial transaction associated with an Intuit Mint® user may be presented with a set of transaction attributes including an initial category displayed on a user interface of a user computing device 140.

Figures 4A, 4B, 4C, 4D:
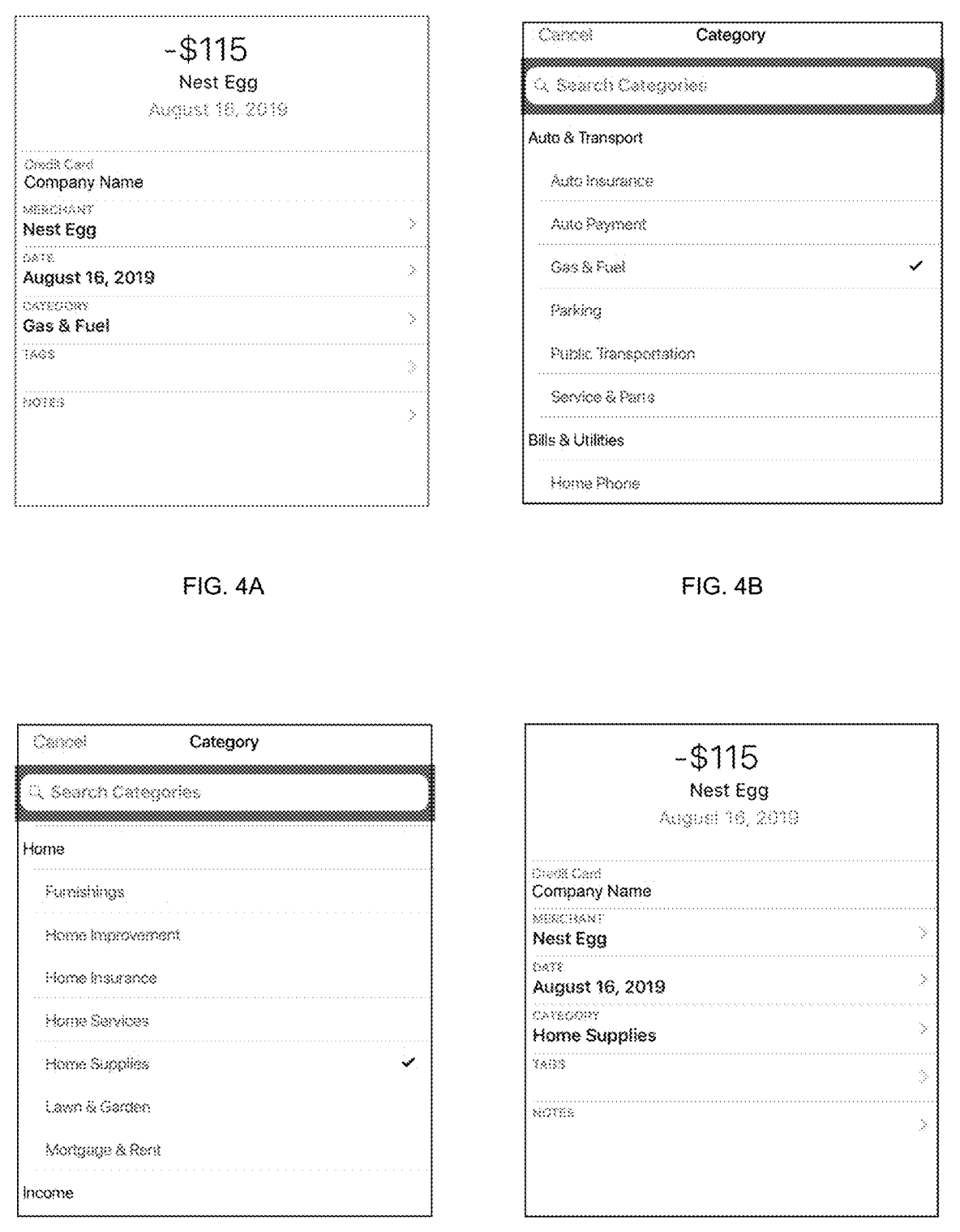

FIG. 4A is an example screenshot of a user financial transaction displayed on a user interface when the user accesses an online financial management service product (e.g., Intuit Mint®) using a user mobile device 140 over a network. As illustrated, the displayed attributes of an example transaction may include a merchant name having a short description, a date, and an amount of the transaction, and an initial category.

FIG. 4B is an example screenshot of a partial list of a plurality of related categories associated with the displayed user financial transaction provided by the online financial management service (e.g., Intuit Mint®). A list of a plurality of example known categories may be selectable for the user to reassign a category as desired. A list of a plurality of example categories may include "Gas & Fuel," "Public Transportation," "Restaurants," and "Groceries," etc. As illustrated in FIG. 4B, each listed category may be displayed as a selectable user interface object on a user interface of a browser application 143 executed on a user device 140. For example, as illustrated in FIG. 4B, an initial category of "Gas & Fuel" is checked and assigned to the displayed user financial transaction associated to the merchant.

The application server 120 may receive, from a plurality of user computing devices, user inputs that are each associated with re-categorizing a financial transaction from the initial category to one or more other categories for the set of the financial transactions during each time period to form or generate a dataset with regard to the categories associated with the financial transactions. In some embodiments, for financial transactions accumulated during each time period, users may elect one or more other categories and re-categorize each respective transaction with the respective one or more other reassigned category. For example, the user may select a new category different from the initial category from a list of known categories displayed on the user interface of the user device 140 over the network 110, thereby re-categorizing the respective transaction with a new category displayed on the user interface as desired.

FIG. 4C is a screenshot displaying a new category of "Home Supplies" that a user selects for the respective transaction. As a result, FIG. 4D is a screenshot illustrating a transaction with a reassigned category of "Home Supplies" for the respective transaction. For each set of transactions associated to a particular merchant, the initial category may be reassigned to one or more different categories by the users. The users may keep the initially suggested category unchanged. In some embodiments, for financial transactions associated with the initial category, users may reassign one or more new categories and update respective transactions and re-categorize each respective transaction with the respective reassigned category. For each initial category, the application server 120 may collect counts of the initial category and the one or more other categories on a daily basis and accumulate the initial category and the one or more other reassigned categories to obtain a record of category changes during a time period (e.g., one or more weeks, a month). The application server 120 may obtain the accumulated financial transactions associated with a merchant during a plurality of time periods. After the plurality of the time periods, a lookup table may be generated to store records of financial transactions and associated category information.

At 304, for the financial transactions presented to the users and associated with a merchant, the application server 120 may determine counts of each category associated with the financial transactions. The application server 120 may determine counts N(i) of the initial category and one or more other reassigned categories associated with the respective financial transactions. The application server 120 may generate a dataset (e.g., a lookup table) after accumulating the respective transactions during one or more time periods. The dataset may include a plurality of parameters associated with the respective transaction, such as date, transaction attributes, initial category, one or more other reassigned categories, initial category count, count(s) of the one or more reassigned categories, a normalized ratio of the initial category, and normalized ratio(s) of the one or more other reassigned categories.

At 306, the application server 120 may rate categories by determining a re-categorization ratio R(i) for each category C(i) based on the dataset, where i represents a number of variants of categories associated with the accumulated financial transactions and equals to 1 . . . n. The distribution of category changes may be based on each re-categorization ratio of the category C(i). Each re-categorization ratio R(i) may be defined by equation 1.

$$R(i) = \frac{N(i)}{N total} \quad (1)$$

$N_{total}$ represents a total number of the accumulated financial transactions associated with a merchant. N(i) represents counts of respective financial transactions categorized as the initial category or the one or more other reassigned categories, where i represents a number of variants of categories associated with the accumulated financial transactions and equals to 1 . . . n. The variants of categories may include an initial category and the one or more other reassigned categories assigned or reassigned to the respective financial transactions.

Each category distribution D(i) associated with the accumulated financial transactions may be defined by equation 2.

$$D(i) = \frac{1}{R(i)} \quad (2)$$

For the set of the financial transactions associated with the merchant, the application server 120 may normalize each re-categorization ratio of variants of categories. The application server 120 may perform a normalization process to smooth re-categorization ratios for the variants of categories. For example, a sum S of the re-categorization ratio distribution D(i) may be defined by equation 3.

$$S = \sum_{i=0}^{n} \frac{1}{R(i)} \quad (3)$$

A re-categorization normalized ratio Z(i) for each category may be defined by equation 4.

$$Z(i) = \frac{\frac{1}{R(i)}}{\sum_{i=0}^{n} \frac{1}{R(i)}} \quad (4)$$

At 308, the application server 120 may determine a target category $C_T$ for the set of the financial transactions associated with the merchant. In some embodiments, the target category $C_T$ for the set of financial transactions may be determined by the application server 120 by selecting a category corresponding to a minimum value of the re-categorization normalized ratio Z; of variants of categories after a time period. For example, after a particular time period of 30 days, the determined target category $C_T$ may correspond to the best predicted re-categorization based on the past users' behaviors or actions on categorizing the respective financial transactions.

In some embodiments, the transaction instances associated with a merchant may be accumulated during a time period. The accumulated transaction data may be split into a training dataset and a testing dataset using a ratio of 99% to 1%. Based on the training dataset obtained every time period and the process 300, the processor 121 of application server 120 may execute the MAB model 124 with a categorization model 125 to determine the target category $C_T$ for a set of financial transactions associate with a merchant. The remaining 1% of the transactions may be used to explore other categories in proportion to their reassigned category normalized counts.

Table 1 shows a summary of an example re-categorization related to variants of categories associated with the set of financial transactions based on the re-categorization process 300. As illustrated in Table 1, the application server 120 may receive variants of categories including reassigned categories A, B, C and an initial category D for the set of accumulated transactions associated with the merchant based on user inputs after a time period. The categories may be variously distributed based on their ratios. For example, if the re-categorization ratios R(i) of variants of categories are determined as: 500/1000 for category A, 430/1000 for category B, 40/1000 for category C, and 30/1000 for category D. As shown in Table 1 below, based on equation 2, each category distribution may be determined as 1000/500 for category A, 1000/430 for category B, 1000/40 for category C, and 1000/30 for category D. A sum S of the variants of categories distribution may be determined to be 62.66 with equation 3.

As illustrated in Table 1, based on equation 4, the re-categorization normalized ratios Z for variants of categories associated with the merchant may be determined as 0.031 (i.e. 2/62.66) for category A, 0.037 (i.e. 2.32/62.66) for category B, 0.4 (i.e. 25/62.66) for category C, and 0.53 (i.e. 33.33/62.66) for category D. A target category $C_T$ for the set of financial transactions may be determined to be category A which corresponds to a minimum value of the normalized category ratios of the categories associated with the merchant.

TABLE 1

|  |  | Reassigned Category A | Reassigned Category B | Reassigned Category C | Initial Category D (e.g., First Category) |
|---|---|---|---|---|---|
| Total number of Categories or Transactions | 1000 | | | | |
| # of Each Category | | 500 | 430 | 40 | 30 |
| Re-categorization Ratio R(i) | | 500/1000 | 430/1000 | 40/1000 | 30/1000 |
| Re-categorization Ratio Distribution D(i) | | 1000/500 (2) | 1000/430 (2.32) | 1000/40 (25) | 1000/30 (33.33) |
| Sum of Re-categorization Ratio Distribution S | 62.66 | | | | |
| Re-categorization Normalized Ratio Z(i) | | 2/62.66 (0.031) | 2.32/62.66 (0.037) | 25/62.66 (0.4) | 33.33/62.66 (0.53) |
| Target Category (e.g., Second Category) | | Category A | | | |

In some embodiments, the categorization model 125 may be trained and built through multiple iterative processes based on steps of the process 300. In some embodiments, the process 300 may be implemented in a MAB framework utilizing a MAB model 124 configured with algorithms of the categorization model 125.

Figure 5:
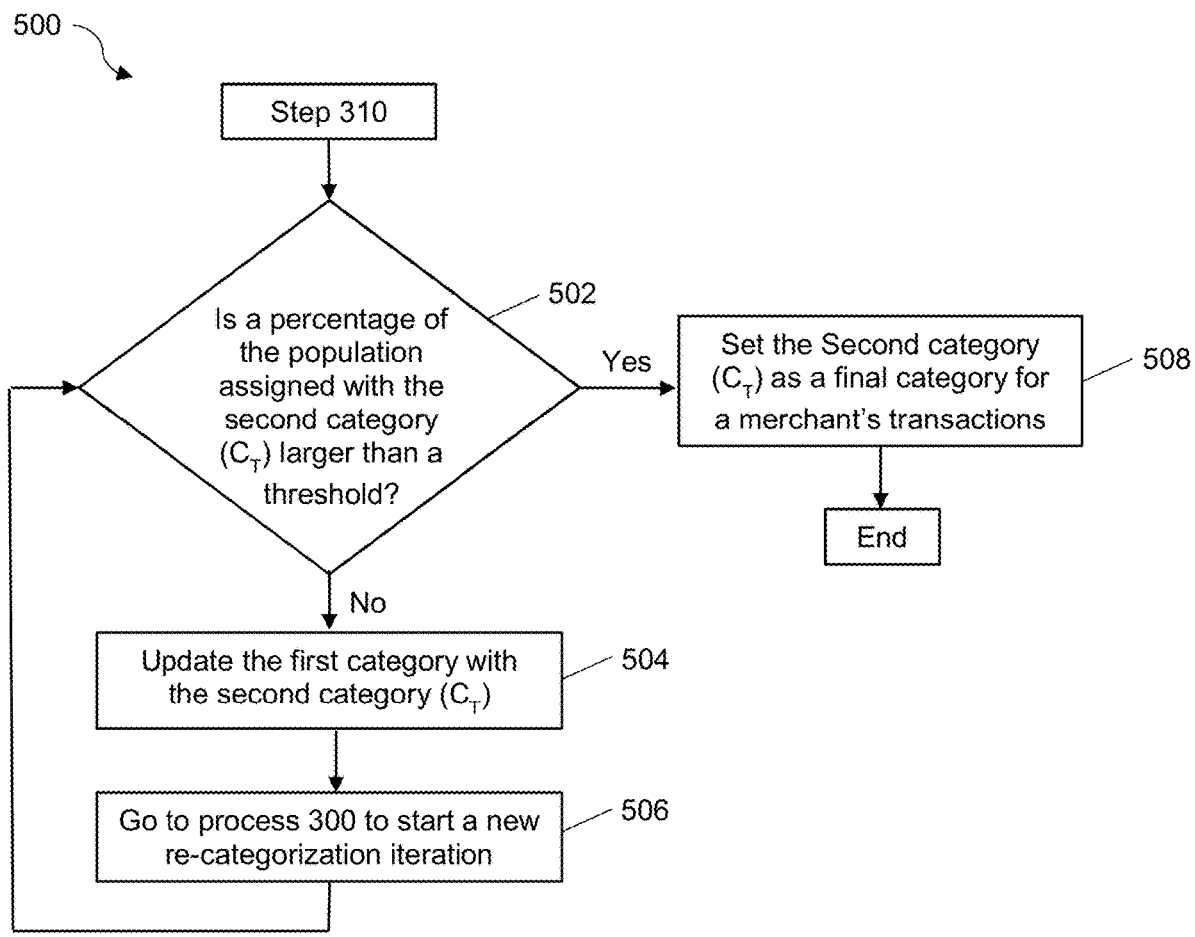
FIG. 5 is a flowchart illustrating an example iterative process of re-categorization in accordance with some embodiments of the present disclosure.

FIG. 5 is a flowchart illustrating an example iterative process of re-categorization in accordance with some embodiments of the present disclosure. After a target category $C_T$ is determined for merchant's transactions accumulated during a time period, the application server 120 may re-weight population distribution over categories to determine whether to continue to explore a final category for the transactions associated with the merchant.

At 502, a target category $C_T$ of the re-categorization may be weighted by the application server 120 to determine whether a percentage of a population assigned with the target category $C_T$ for the associated transactions reaches a threshold value. The described percentage of the population may indicate how satisfactory a determined target category $C_T$ is based on an analysis of the category changes for the financial transactions associated with the merchant. The threshold value may be adjustable and set to be one of different values by the application server 120. In one embodiment, the target category $C_T$ of the re-categorization may be weighted by the MAB model 124 of the application server 120 to determine whether a percentage of a population assigned with the target category $C_T$ for the associated transactions reaches a threshold value. For example, the threshold value may be set to be 99%, which indicates that the process 300 may be iteratively performed until 99% of users choose or prefer to use the target category $C_T$ for their transactions associated with the merchant.

At 504, in response to determining that the percentage of the population assigned with the target category $C_T$ does not reach or is less than the threshold value, the category of the merchant transactions may be updated with the determined target category $C_T$ by the application server 120 in real time on an ongoing basis.

At 506, the MAB model 124 may be configured with algorithms of the categorization model 125 and utilized through an iterative process 300 for processing the received transaction instances during multiple time periods. The application server 120 may generate a corresponding dataset for the respective transactions during each time period. The process 300 may be iteratively performed to continuously update the target category $C_T$ in real time until a percentage of the population assigned with the target category $C_T$ reaches the threshold value (e.g., 99%). In some embodiments, the built categorization model 125 may be utilized independently through an iterative process 300 for processing the received transaction instances during multiple time periods to continuously update the target category $C_T$ in real time until a percentage of the population assigned with the target category $C_T$ reaches the threshold value.

At 508, when the percentage of the population assigned with the target category $C_T$ reaches the threshold value, the application server may set the determined target category $C_T$ as a final category for each transaction instances associated with the merchant. For example, a merchant of "Uber" was categorized as "Bars and Alcohol" when it was not widely known. Most of the users may re-categorize the corresponding transactions with a category as "Transportation" (or a similar category). Once 99% of users have "Uber" transactions being assigned with "Transportation," almost none of users may change it to other categories. As a result, the re-weighted population distribution of the re-categorization may put a much stronger emphasis on "Transportation". Accordingly, "Transportation" is provided to associated user financial transactions and displayed on each user interface to be a final category for "Uber" as expected by the users.

Correct categorization on user financial transactions may have direct influence on online software product services (e.g., Intuit Mint® applications) with regard to user budget planning and finance tracking, personalized advertisements, and profiling information to aid program optimization, etc.

Embodiments described herein may be utilized in reassigning and optimizing categorizes for each of a plurality of merchants based on the computing environment 100 with the processes 300 and 500 described in FIG. 3 and FIG. 5. By referring to FIG. 1, applications 123 may include a web application stored in memory 122 and a financial service product executed by processor 121 for implementing categorization for a plurality of merchants based on the categorization model 125 and MAB model 124.

The described instructions or algorithms may be utilized with Application 123 which may provide particular online software product services (e.g., Intuit Mint® applications) in communication with the user devices 140 through the network 110. The instructions or algorithms of the MAB model 124 and categorization model 125 may be validated and transformed to be stored in computer-readable medium with related computer program instructions operable to cause the application server 120 and the user devices 140 of the computing environment 100 to perform operations as described in processes 300 and 500 for categorization and re-categorization based on merchant or user needs. As a result, the described re-categorization processes may constantly explore the correct categorization of presumably known and/or novel types of purchases. This approach may boost the ability of the existing categorization engine or any future version thereof, and allow the application server to update transaction categories as the MAB categorization model or framework operates in a constantly changing environment. For example, the application 123 may conduct processes including receiving inputs from users regarding category changes of user transactions, processing the user inputs, updating the determined target category of the associated user transactions, and determine a final category on respective user interfaces of user devices 140 via the respective web application 143.

In some embodiments, the computing environment 100 may be implemented in a cloud computing environment. User devices 140 may access to a cloud computing system over networks to interact with an online software product service 123 executed on the application server 120. The application server 120 may dynamically observe and analyze user actions on the transaction categories and automatically perform operations of described processes 300 and 500 over the cloud to implement category optimization in real time in response to constantly changing scenarios in the financial environment. The embodiments described herein may improve technologies of transaction categorization or product categorization associated with any types of business products and services in an area of financial transaction management.

Figure 6:
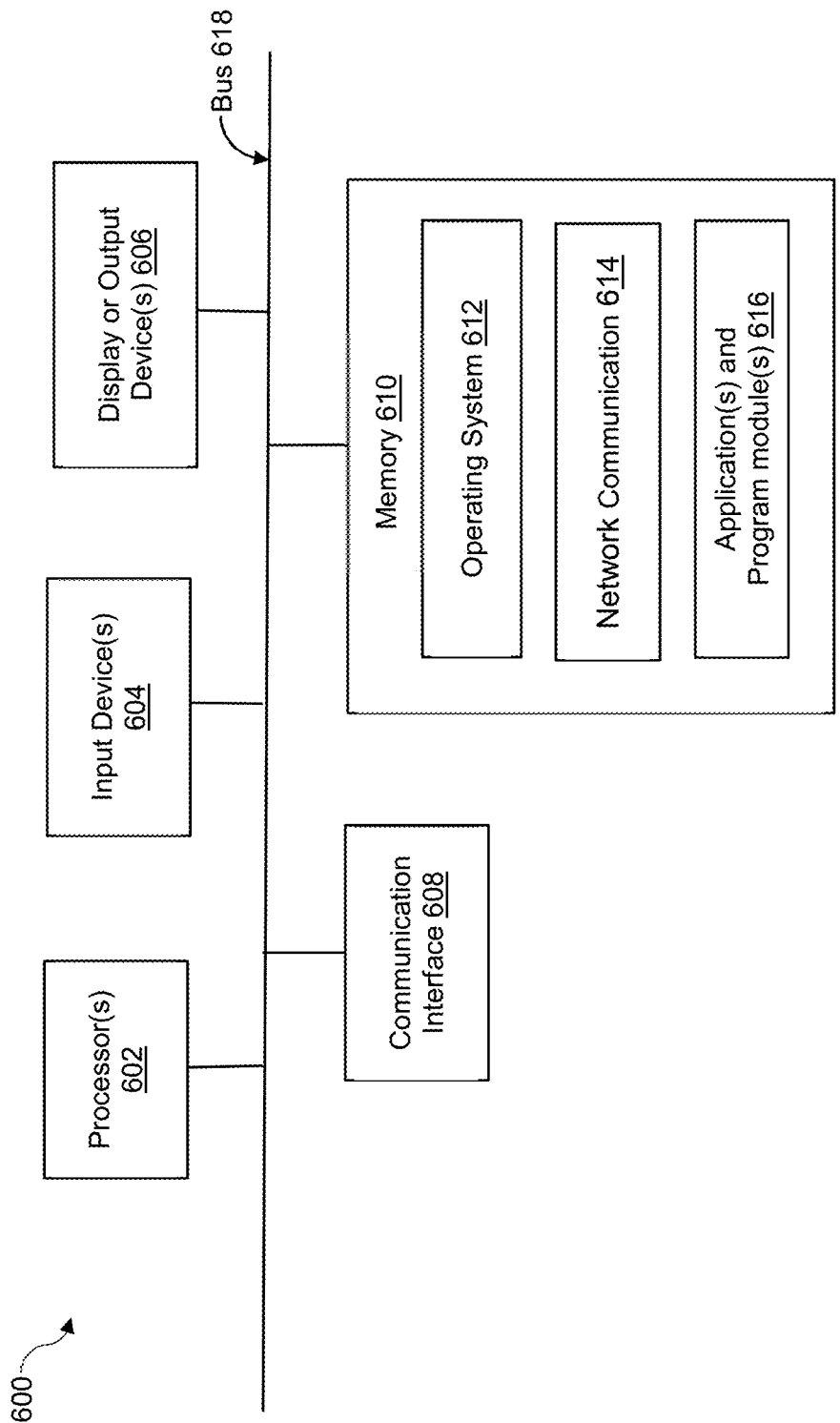
FIG. 6 is a block diagram of an example computing device in accordance with some embodiments of the present disclosure.

FIG. 6 is a block diagram of an example computing device 600 that may be utilized to execute embodiments to implement processes including various features and functional operations as described herein. For example, computing device 600 may function as application server 120, financial server 130, client device 140 (e.g., user device) or a portion or combination thereof in some embodiments. The computing device 600 may be implemented on any electronic device to execute software applications derived from program instructions, and may include but is not limited to personal computers, servers, smart phones, media players, electronic tablets, game consoles, email devices, etc. In some implementations, the computing device 600 may include one or more processors 602, one or more input devices 604, one or more display or output devices 606, one or more communication interfaces 608, and memory 610. Each of these components may be coupled by bus 618, or in the case of distributed computer systems, one or more of these components may be located remotely and accessed via a network.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 604 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 606 such as a CRT (cathode ray tube) or LCD (liquid crystal display) monitor for displaying information to the user and a keyboard and a pointing device such as a mouse or a trackball by which the user can provide input to the computer. Display device 606 may be any known display technology, including but not limited to display devices using Liquid Crystal Display (LCD) or Light Emitting Diode (LED) technology.

Communication interfaces 608 may be configured to enable computing device 600 to communicate with other another computing or network device across a network, such as via a wired connection, a wireless connection, or a combination of wired and wireless connections. For example, communication interfaces 608 may include an Ethernet interface, an optical interface, a coaxial interface, an infrared interface, a radio frequency (RF) interface, a universal serial bus (USB) interface, a Wi-Fi interface, a cellular network interface, or the like.

Memory 610 may be any computer-readable medium that participates in providing computer program instructions and data to processor(s) 602 for execution, including without limitation, non-volatile storage media (e.g., optical disks, magnetic disks, flash drives, etc.), or volatile storage media (e.g., SDRAM, ROM, etc.). Memory 610 may include various non-transitory computer-readable instructions for implementing an operating system 612 (e.g., Mac OS®, Windows®, Linux), network communication 614, and Application(s) and program modules 616, etc. The operating system may be multi-user, multiprocessing, multitasking, multithreading, real-time, and the like. The operating system may perform basic tasks, including but not limited to: recognizing input from input device 604; sending output to display device 606; keeping track of files and directories on memory 610; controlling peripheral devices (e.g., disk drives, printers, etc.) which can be controlled directly or through an I/O controller; and managing traffic on bus 618. Bus 618 may be any known internal or external bus technology, including but not limited to ISA, EISA, PCI, PCI Express, NuBus, USB, Serial ATA or FireWire.

Network communications instructions 614 may establish and maintain network connections (e.g., software applications for implementing communication protocols, such as TCP/IP, HTTP, Ethernet, telephony, etc.).

Application(s) and program modules 616 may include software application(s) and different functional program modules which are executed by processor(s) 602 to implement the processes described herein and/or other processes. The program modules may include but not limited to software programs, objects, components, data structures that are configured to perform particular tasks or implement particular data types. The processes described herein may also be implemented in operating system 612.

Communication between various network and computing devices may be facilitated by one or more application programming interfaces (APIs). APIs of system 600 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a server computing device comprising a processor and a non-volatile memory storing computer-executable instructions, the server computing device in communication with a plurality of user computing devices over at least one network, the method comprising:
receiving a plurality of financial transactions associated with a first category, each of the plurality of financial transactions being associated with a merchant and the first category;
receiving, from the plurality of user computing devices, user inputs that are each associated with re-categorizing one of the plurality of financial transactions from the first category to one or more other categories;
determining, based at least in part on a count of the first category and counts of the one or more other categories, a set of normalized ratios for the first category and the one or more other categories with respect to a total number of the plurality of financial transactions; and
determining a second category for each financial transaction associated with the merchant, the second category corresponding to a minimum value in the set of the normalized ratios.

2. The method of claim 1, wherein the instructions are further operable to cause the server computing device to perform:
determining a percentage of a population assigned with the second category for the plurality of the financial transactions during the time period;
determining whether the percentage of the population assigned with the second category for the respective financial transactions reaches a threshold value; and
in response to the percentage of the population being determined not to exceed the threshold value, iteratively executing a multi-armed bandit model to update the first category of the financial transactions with the second category.

3. The method of claim 1, wherein the instructions are further operable to cause the server computing device to perform:
generating a dataset for the financial transactions during the time period, the dataset comprising a set of transaction attributes, a first category, one or more other categories, an account of the first category, counts of the one or more other categories, a normalized ratio for the first category, and the normalized ratios of the one or more other categories.

4. The method of claim 1, wherein the instructions are further operable to cause the server computing device to perform:
presenting, on each user interface of a user computing device associated with each user over the at least one network, each financial transaction with a set of transaction attributes and a list of known categories.

5. The method of claim 1, wherein the instructions are further operable to cause the server computing device to perform:
determining, based on each dataset, each re-categorization distribution of the first category and the one or more other categories for the respective financial transactions associated with the merchant during the time period.

6. The method of claim 5, wherein the instructions are further operable to cause the server computing device to perform:
based on each determined re-categorization distribution of the first category and the one or more other categories, determining the normalized ratio of each respective category for the respective financial transactions.

7. The method of claim 6, wherein the instructions are further operable to cause the server computing device to perform:
building a reassignment model to determine the second category for respective financial transactions each associated with the merchant during the plurality of the time periods.

8. The method of claim 4, wherein the transaction attributes associated with each financial transaction comprise the merchant, a textual description, a date, and a transaction amount.

9. The method of claim 1, wherein a time period is a month.

10. A computing system, the computing system comprising a server computing device in communication with a plurality of user computing devices over at least one network, the server computing device comprising a non-volatile memory and a processor coupled to the memory having computer-executable instructions stored which, when executed by the processor, causes the server computing device to preform:
receiving a plurality of financial transactions associated with a first category, each of the plurality of financial transactions being associated with a merchant and the first category;
receiving, from the plurality of user computing devices, user inputs that are each associated with re-categorizing one of the plurality of financial transactions from the first category to one or more other categories;
determining, based at least in part on a count of the first category and counts of the one or more other categories, a set of normalized ratios for the first category and the one or more other categories with respect to a total number of the plurality of financial transactions; and determining a second category for each financial transaction associated with the merchant, the second category corresponding to a minimum value in the set of the normalized ratios.

11. The computing system of claim 10, wherein the instructions are further operable to cause the server computing device to perform:

determining a percentage of a population assigned with the second category for the plurality of the financial transactions during the time period;

determining whether the percentage of the population assigned with the second category for the respective financial transactions reaches a threshold value; and in response to the percentage of the population being determined not to exceed the threshold value, iteratively executing a multi-armed bandit model to update the first category of the financial transactions with the second category.

12. The computing system of claim 10, wherein the instructions are further operable to cause the server computing device to perform:

generating a dataset for the financial transactions during the time period, the dataset comprising a set of transaction attributes, a first category, one or more other categories, an account of the first category, counts of the one or more other categories, a normalized ratio for the first category, and the normalized ratios of the one or more other categories.

13. The computing system of claim 10, wherein the instructions are further operable to cause the server computing device to perform:

presenting, on each user interface of a user computing device associated with each user over the at least one network, each financial transaction with a set of transaction attributes and a list of known categories.

14. The computing system of claim 12, the instructions are further operable to cause the server computing device to perform:

determining, based on each dataset, each re-categorization distribution of the first category and the one or more other categories for the respective financial transactions associated with the merchant during the time period.

15. The computing system of claim 14, wherein the instructions are further operable to cause the server computing device to perform:

based on each determined re-categorization distribution of the first category and the one or more other categories, determining the normalized ratio of each respective category for the respective financial transactions.

16. The computing system of claim 15, wherein the instructions are further operable to cause the server computing device to perform:

building a reassignment model to determine the second category for respective financial transactions each associated with the merchant during the plurality of the time periods.

17. The computing system of claim 13, wherein the transaction attributes associated with each financial transaction comprise the merchant, a textual description, a date, and a transaction amount.

18. The computing system of claim 10, wherein a time period is a month.

19. A computing system, the computing system comprising a server computing device in communication with a plurality of user computing devices over at least one network, the server computing device comprising a non-volatile memory and a processor coupled to the memory having computer-executable instructions stored which, when executed by the processor, causes the server computing device to perform:

receiving a plurality of financial transactions associated with a first category, each of the plurality of financial transactions being associated with a merchant and the first category;

receiving, from the plurality of user computing devices, user inputs that are each associated with re-categorizing one of the plurality of financial transactions from the first category to one or more other categories;

determining, based at least in part on a count of the first category and counts of the one or more other categories, a set of normalized ratios for the first category and the one or more other categories with respect to a total number of the plurality of financial transactions;

determining a second category for each financial transaction associated with the merchant, the second category corresponding to a minimum value in the set of the normalized ratios;

determining a percentage of a population assigned with the second category for the plurality of the financial transactions during the time period;

determining whether the percentage of the population assigned with the second category for the respective financial transactions reaches a threshold value; and in response to the percentage of the population being determined not to exceed the threshold value, iteratively executing a multi-armed bandit model to update the first category of the financial transactions with the second category.

20. The computing system of claim 19, wherein the instructions are further operable to cause the server computing device to perform:

determining, based on each dataset, each re-categorization distribution of the first category and the one or more other categories for the respective financial transactions associated with the merchant during the time period; and based on each determined re-categorization distribution of the first category and the one or more other categories, determining the normalized ratio of each respective category for the respective financial transactions.

* * * * *